A. T. MANLY.
Domestic Boiler.
No. 94,498. Patented Sept. 7, 1869.
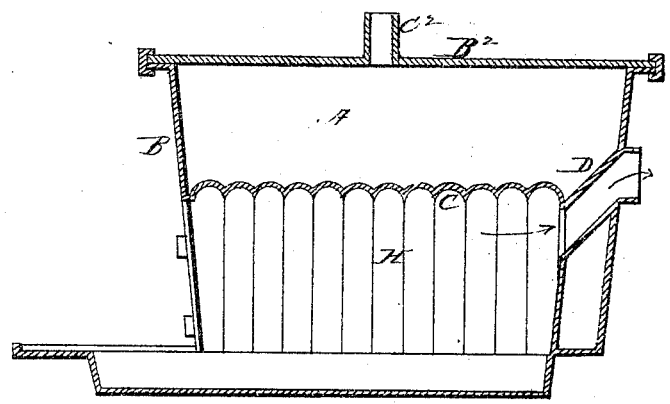
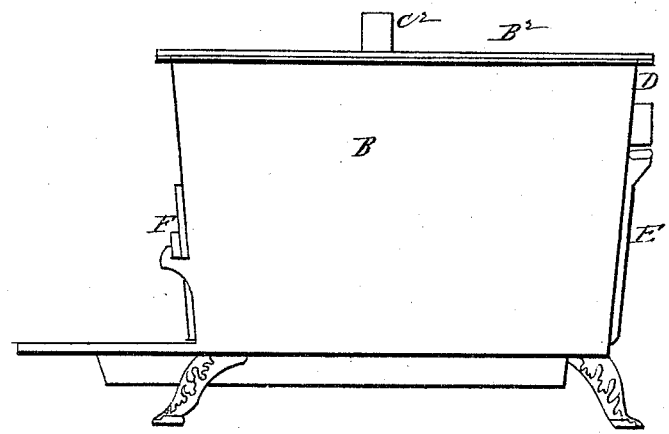
Witnesses
James Sangster
S. M. Sangster
Inventor
Adin T. Manly

United States Patent Office.

ADIN T. MANLY, OF BUFFALO, NEW YORK.

Letters Patent No. 94,498, dated September 7, 1869.

---

STEAMER FOR AGRICULTURAL AND OTHER PURPOSES.

---

The Schedule referred to in these Letters Patent and making part of the same.

---

*To all whom it may concern:*

Be it known that I, ADIN T. MANLY, of Buffalo, in the county of Erie, in the State of New York, have invented certain new and useful Improvements in Steamers for Agricultural or other Purposes; and I do hereby declare that the following description thereof is sufficiently clear and exact to enable others skilled in the art to which it appertains, or to which it is most nearly connected, to make and use the same, reference being had to the accompanying drawings, and to the letters of reference marked thereon, in which—

Figure 1 represents a vertical section,

Figure 2, a side elevation of my improved steamer.

The nature of my invention consists in the arrangement of a corrugated fire-box within the boiler, and a pipe leading from it through the water-space, to carry off the products of combustion; the arrangement of the corrugations being across the fire-box, and not in the direction of its length.

In the accompanying drawings, in which similar parts are represented by like letters in the several figures—

B represents the body of the boiler;

A, the interior or water-space; and

H the interior of the fire-box, showing the arrangement and form of the corrugations, one of which is marked C. It will be readily seen that the arrangement of these corrugations more than doubles the fire-surface, and being placed crosswise, a much greater effect is obtained, by the heat passing through them, than if they were placed lengthwise.

D represents the smoke-pipe, leading from the fire-box through the water-space, as shown in fig. 1.

E represents the tube by which the boiler is filled. It may be stopped by a stop-cock, or other equivalent device.

$B^2$ represents the top of the boiler. It is fastened down in place by means of clamps, with the usual packing.

$C^2$ represents a pipe, to which a rubber tube, or other suitable device, may be fastened, for the purpose of conducting the steam into any suitable vessel for boiling purposes, either as food for cattle, laundry, or other uses. It may also be used as an evaporator for sugar, salt, &c.

I construct my steamer of cast-iron. The corrugated fire-box, the pipe D, and the body of the steamer B, are all cast in one piece, thereby insuring strength, durability, and cheapness.

Having thus described my invention, with sufficient clearness to enable others skilled in the art to make, construct, and use the same,

What I claim as new, and desire to secure by Letters Patent, is—

The construction and combination of the corrugated fire-box H, with the filling-tube E and conducting-pipe D, arranged substantially as herein described.

ADIN T. MANLY.

Witnesses:
JAMES SANGSTER,
S. M. SANGSTER.